US006946959B2

(12) United States Patent
Wang

(10) Patent No.: US 6,946,959 B2
(45) Date of Patent: Sep. 20, 2005

(54) WIRELESS ALARM SYSTEM FOR CONTRIBUTING SECURITY NETWORK

(76) Inventor: Randall Wang, 4978 Santa Anita Ave., Temple City, CA (US) 91780

( * ) Notice: Subject to any disclaimer, the term of this patent is extended or adjusted under 35 U.S.C. 154(b) by 0 days.

(21) Appl. No.: 10/326,676

(22) Filed: Dec. 20, 2002

(65) Prior Publication Data

US 2004/0119590 A1 Jun. 24, 2004

(51) Int. Cl.[7] .................................................. H04Q 7/00
(52) U.S. Cl. .............................. 340/539.22; 340/539.11
(58) Field of Search ......................... 340/539.22, 539.1, 340/539, 825.5

(56) References Cited

U.S. PATENT DOCUMENTS 3,792,455 A * 2/1974 Phillips ...................... 340/518
4,908,602 A * 3/1990 Reich et al. ................ 340/514
5,257,007 A * 10/1993 Steil et al. ............... 340/539.3
6,052,052 A * 4/2000 Delmonaco ............ 340/539.11
6,078,269 A * 6/2000 Markwell et al. ........ 340/825.5
6,310,549 B1 * 10/2001 Loftin et al. ................ 340/547

* cited by examiner

*Primary Examiner*—Jeffery Hofsass
*Assistant Examiner*—Eric Blount
(74) *Attorney, Agent, or Firm*—Raymond Y. Chan; David and Raymond

(57) ABSTRACT

A portable wireless alarm system includes at least two alarm devices each of which includes a signal generator for generating an action signal, wherein the alarm devices are communicatively networked with each other by means of radio frequency to contribute a security network in such a manner that, within the security network, when one of the alarm devices is triggered to generate the action signal, another alarm device is automatically triggered by the action signal to produce alert signal, so as to enlarge a coverage area of the alarm device. In addition, the alarm device is a portable wireless alarm device that is communicated with an alarm activator by means of radio frequency signal to remotely control the alarm device to be activated. Therefore, the portable wireless alarm device is capable of wirelessly setting up at a designated location with free installation to ensure the best security.

62 Claims, 6 Drawing Sheets

WIRELESS ALARM SYSTEM FOR CONTRIBUTING SECURITY NETWORK

BACKGROUND OF THE PRESENT INVENTION

1. Field of Invention

The present invention relates to an alarm system, and more particularly to a wireless alarm system which comprises at least two portable alarm devices to provide a communication network with each other for contributing a security network. In addition, the a portable alarm device used in the wireless alarm system is easy to operate and does not require installation for all kinds of vehicle such as car, aircraft, boat, mobile home, etc.

2. Description of Related Arts

Most residences, facilities, and vehicles have installed security alarm systems to monitor the properties from burglars and accidents. A conventional security alarm system, such as burglary alarm system, generally comprises a control system to control a plurality of security devices, such as motion detectors for detaching human action within the protection areas, window sensors for detecting any damage thereof, opening contacts such as door/window switches for detecting in and out of people, and alert devices including communication devices such as voice dialer and/or digital dialer and audible and visual alarm devices for providing local alarm when burglar breaks in the protection area. Due to the security purpose, most people would like to install such security alarm system in their houses and/or the vehicle to protect their properties.

Generally speaking, the conventional security alarm system is in disarming condition. The user can switch the security alarm system to an arming condition by setting a control keypad or a remote control of the control system to activate all the security devices before the user leaves. The user can switch off (disarmed) the alarm system by setting the control keypad or remote control when the user comes back.

However, the conventional security alarm system has several drawbacks. All the security devices must be properly installed. For example, the motion detectors and the window sensors must be electrically wired to each single room of a house/facility from the control system for house installation. The alert device must be electrically connected to a battery of the vehicle as a car alarm system. Since the installation of the conventional security alarm is complicated and costly, a qualified technician is required to install the conventional security alarm. An improper installation of such security alarm may cause a false alarm or even damage the electrical wiring system of the house, facility, or vehicle.

In addition, the maintenance of the conventional security alarm system is also costly. When one of the components does not function, the whole system may be disabled as well. Therefore, the user usually pays for the maintenance perimeter for the alarm system provider in order to keep the well function of the security alarm system.

Accordingly, the installation of the security alarm system is a must. In other words, the user must install different security alarm systems for his of her properties. For example, the house of the user must employ one kind of security alarm system and the vehicle of the user must employ another kind of security alarm system. Therefore, the user will pay an extremely high cost for those security alarm systems.

Therefore, a kind of portable wireless alarm system is highly desired in market so that the user may move the alarm system from place to place, such as from one room to another room, from one vehicle to another vehicle or from home to a vehicle, independently for security purposes.

However, no matter the security alarm system is a stationary type or a portable type, once it is disarmed or destroyed the alarm system has no function and is useless. For portable alarm system, it is even more easily be discovered and damaged. Therefore, most of the alarm systems can't stop burglars who visit the place before or know the place well. Such burglar can get to the control panel immediately and destroy it within seconds to disarm the system. Further example, an experienced car thief can open the hood and disconnect the respective car alarm system wires to disarm the car alarm within couple seconds. If no one alerts of such couple-second siren, the car is gone. Unlucky, there is no solution to such situations.

Moreover, each security alarm system has the own setting and is unable to communicate with each other such that each of the security alarm system works independently. For example, when the security alarm system of a neighbor of the user is triggered to perform an alert response, the security alarm system of the user will remained inactivated. Therefore, the user cannot immediately help the neighbor. In other words, no communication and relationship between any two neighbor-users with a safety area so that the security alarm system can only monitor the own setting coverage area.

SUMMARY OF THE PRESENT INVENTION

A main object of the present invention is to provide a method of contributing a security network which includes more than one alarm devices in different places communicating with each other in a wireless manner that once anyone of such alarm devices is triggered or receives any damage or is informally or illegally operated, an activating signal is sent to the predetermined alarm devices to activate them to provide alert signals, such as siren, for a predetermined period of time. Therefore, even the alarm device is destroyed by a thief or burglar, other networked alarm devices will still provide alert signals for protection. In other words, each independent alarm device of the security network is a back-up system of every other independent alarm device and all the independent alarm devices form a powerful security community that the thief or burglar has no way to determine where are the other networked alarm devices and to disarm or destroy them simultaneously.

Another object of the present invention is to provide a portable wireless alarm system which comprises at least two alarm devices adapted to be networked with each other by means of radio wave, such that when one of the alarm devices is triggered to perform an alert response, another alarm device will be correspondingly triggered. In other words, the coverage area of the portable wireless alarm system will be substantially enlarged with respect to the number of alarm devices are incorporated.

Another object of the present invention is to provide a portable wireless alarm system, wherein once one of the alarm devices of the security network is triggered to produce alert signal, the other predetermined alarm devices will also be activated to produce alert signals, so that the protection coverage area of any of the alarm devices is greatly enlarged.

Another object of the present invention is to provide a portable wireless alarm system, wherein the alarm device is relatively economic in cost so that it is affordable to every-body. Moreover the alarm device is so handy that it is adapted to be employed with any real estate properties, such as house or facility, or moving properties, such as air aircraft or vehicle.

Another object of the present invention is to provide a portable wireless alarm system, wherein a protection area of the alarm device can be selected by the user by selectively locating the alarm device such as hanging close to an entrance for detecting in and out of people, placing at a fuselage of an aircraft or an interior of a vehicle, or an interior of a house for detaching human action within the protection areas.

Another object of the present invention is to provide a wireless security network, wherein each of the alarm devices uses a short range radio wave to transmit the activating signal to communicatively network with another alarm device so as to expand the coverage area comparing with the conventional alarm system.

Another object of the present invention is to provide a portable wireless alarm system, wherein no installation is required for the alarm device such that the user is able to carry the alarm device places to places where the properties are needed to be protected.

Another object of the present invention is to provide a portable wireless alarm system, which provides a false alarm reduction analysis and self-adjusting control to adjust the duration of the delay period during the verification condition according to the substantial needs, so as to ensure the best security and minimize the false alarm.

Accordingly, in order to accomplish the above objects, the present invention provides a portable wireless alarm system, which comprises:

at least two alarm devices, each comprising a signal generator for generating an action signal, wherein the alarm devices are communicatively networked with each other by means of radio frequency to contribute a security network, in such a manner that, within the security network, when one of the alarm devices is triggered to generate the action signal, another alarm device is automatically triggered by the action signal, so as to enlarge a coverage area of the alarm device; and at least an alarm activator communicating with the corresponding alarm device to remotely control the alarm device to be activated.

The present invention also provides a method of contributing a security network which includes more than one alarm devices in different places communicating with each other in a wireless communication manner, wherein the method includes the steps of:

(a) sending at least an activating signal to one of more other predetermined alarm devices when one of the alarm devices is triggered; and (b) activating the alarm device which received the activating signal to provide an alert signal for a predetermined period of time.

In addition, the present invention further comprises a communication process of a portable wireless alarm system which comprises at least two alarm devices communicatively networked with each other by means of radio frequency to contribute a security network, wherein process comprises the steps of:

(a) detecting a motion signal within a protection area of one of the alarm devices;

(b) triggering the corresponding alarm device to generate an alert signal;

(c) sending an action signal of the radio frequency from the alarm device to another alarm device; and (d) triggering the alarm device to generate an alert signal when the alarm device receives the action signal within the security network.

DETAILED DESCRIPTION OF THE PREFERRED EMBODIMENT

Figure 1:
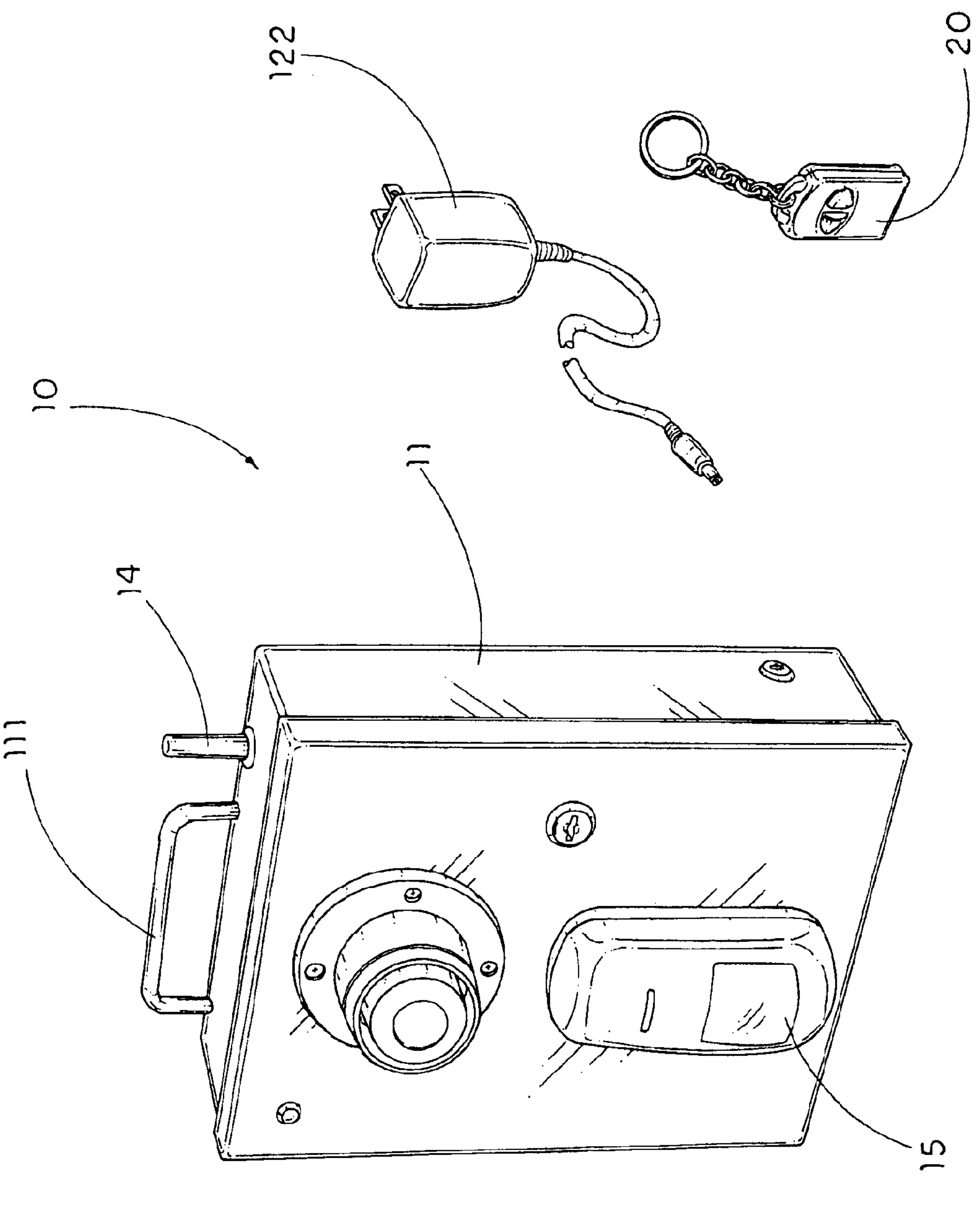
FIG. 1 is a perspective view of a portable wireless alarm system to contribute a security network according to a preferred embodiment of the present invention.
Figure 2:
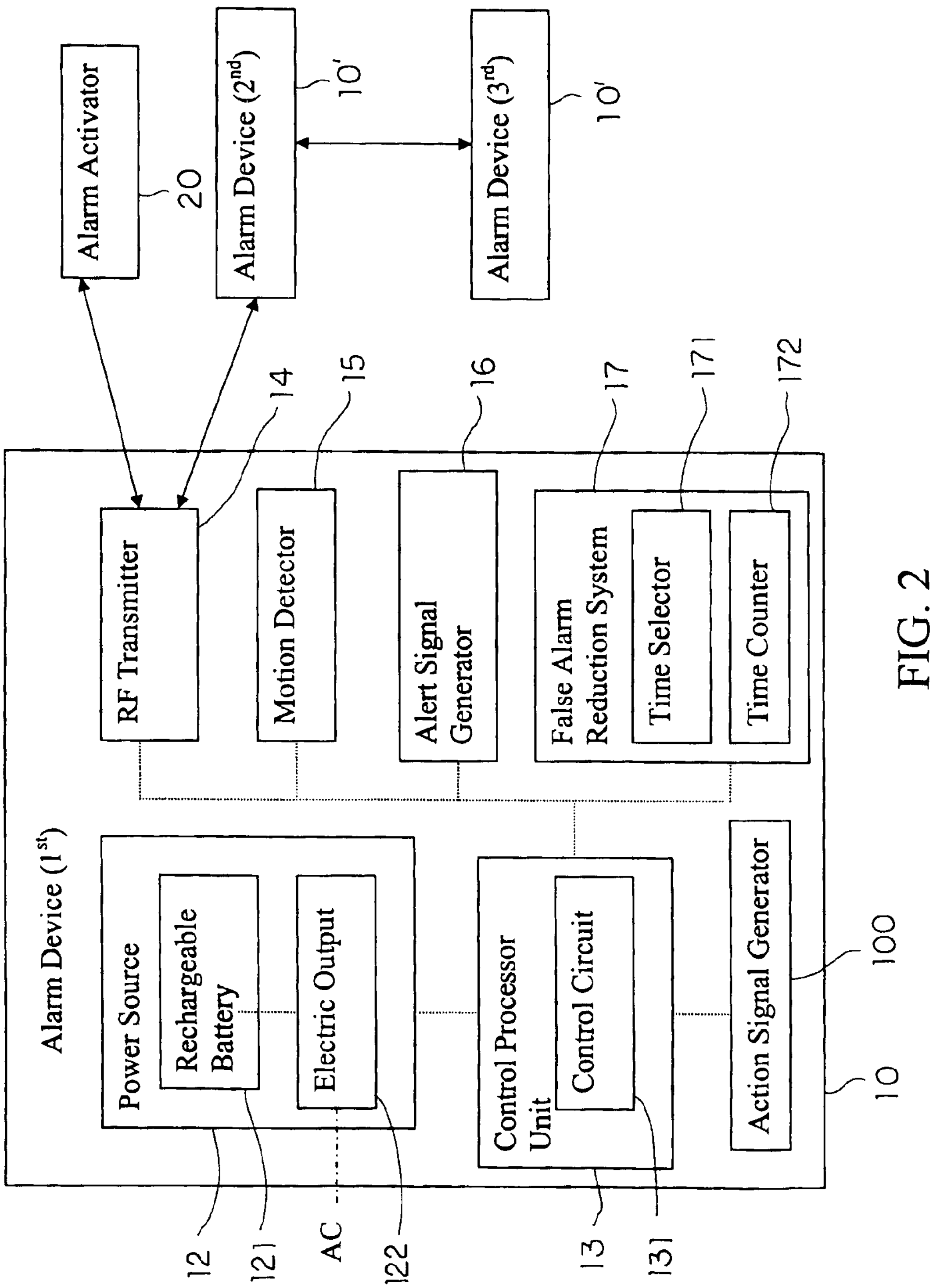
FIG. 2 is a block diagram illustrating the connection relationship between the alarm device and the alarm activator of the portable wireless alarm system according to the above preferred embodiment of the present invention.

Referring to FIGS. 1 and 2 of the drawings, a portable wireless alarm system according to a preferred embodiment is illustrated, wherein the portable wireless alarm system comprises two or more alarm devices 10 each comprising an action signal generator for generating an action signal, and an alarm activator 20 communicating with the corresponding alarm device 10 to remotely control the alarm device 10 to be activated.

The alarm devices 10 are adapted for locating spaced apart from each other and communicatively networked with each other by means of radio frequency to contribute a security network within the security network, when one of th alarm devices 10 is triggered to generate the action signal sending to one or more of the other alarm devices 10, the alarm device 10 that receives the action signal is automatically triggered to produce alert signals, so as to enlarge a coverage area of the alarm device 10.

Each alarm device 10, according to the preferred embodiment as shown in FIG. 1, is preferably a portable alarm device which comprises a portable case 11, a power source 12 received in the portable case 11, a control processor unit 13 electrically connected with the power source 12, a RF transmitter 14 electrically connected to the control processor unit 13 for transmitting a radio frequency, and motion detector 15 electrically connected to the control processor unit 13 for detecting any motion signal within a predetermined protection area.

The alarm activator 20 is communicating with the control processor unit 12 through wireless communication means such as radio frequency signal to remotely control the activation of the alarm device 10. Basically, the alarm activator 20 is used for activating and deactivating the alarm device 10 through radio frequency. Therefore, no code is required for the user to input in order to activate and deactivate the alarm device 10. Accordingly, the alarm activator 20 is shaped and sized to have a compact unit that the user is able to put the alarm activator 20 as a remote control in his or her pocket.

Figure 3:
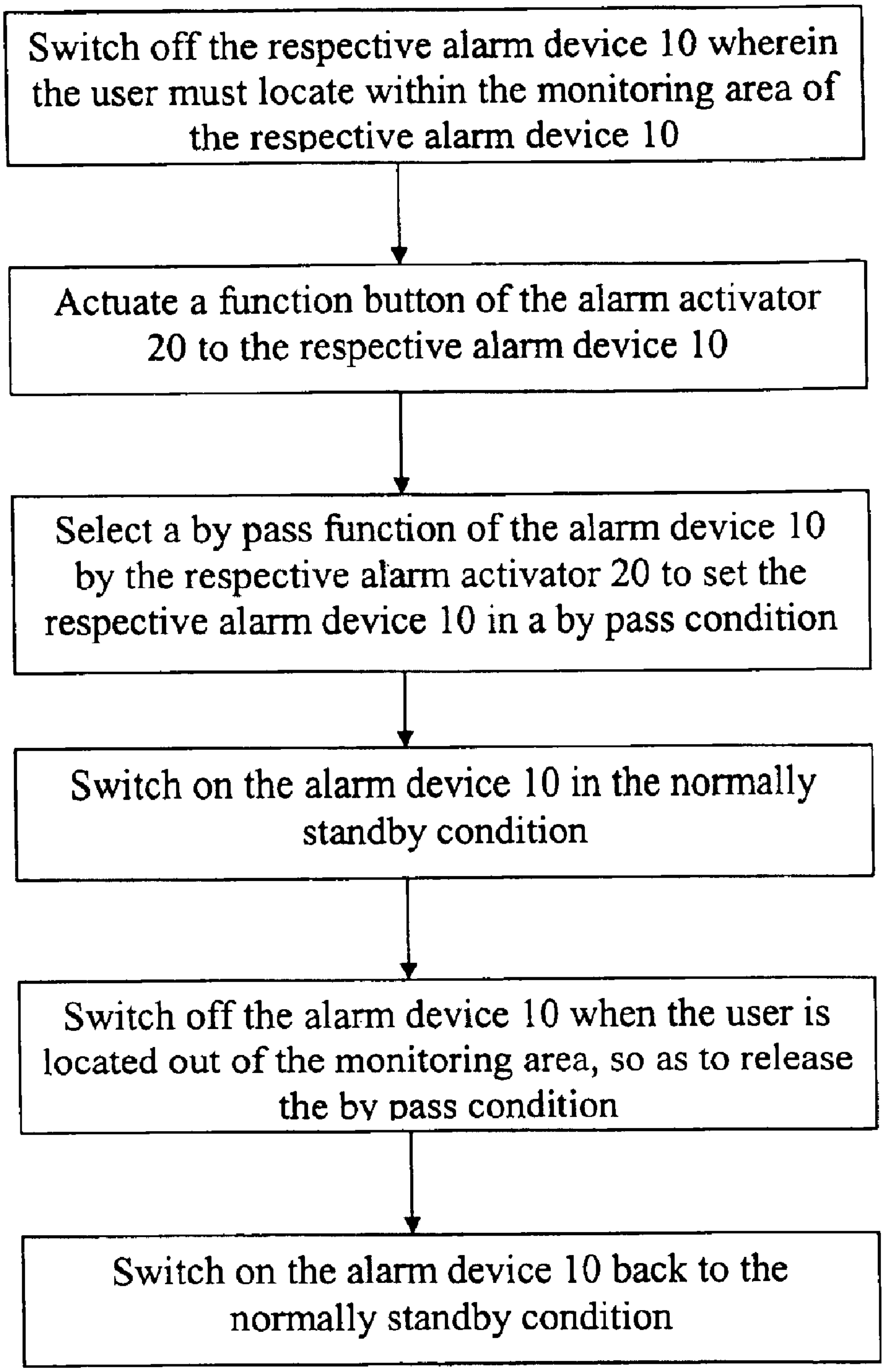
FIG. 3 is a block diagram illustrating a by-pass motion detecting process of the portable wireless alarm system according to the above preferred embodiment of the present invention.

Accordingly, referring to FIGS. 1, 2 and 3, the portable wireless alarm system also provides a security network process which comprises the following steps.

(1) Locate an alarm device 10 having at least a sensor such as a motion detector 15 at a designated place while one or more other alarm devices 10' are located in different places each having a predetermined security distance from the alarm device.

(2) Tune the alarm device 10 until the alarm device 10 is communicatively networked with the other alarm devices 10' to contribute a security network.

(3) Switch on the respective alarm device 10 by the alarm activator 20 to a functioning condition.

(4) Detect any motion activity occurred within the protection area by the motion detector 15 of the alarm device.

(5) Activate the control processor unit 13 of the alarm device 10 to send an alerting radio frequency (RF) signal to the alarm activator 20 through the RF transmitter 14 and to send the action signal by the action signal generator to other alarm devices 10' for activating such other alarm devices 10' within the security network.

In addition, the security network process further comprises the step of:

(6) Produce an alert signal from an alert signal generator 16 of the alarm device 10 when the alarm device 10 is activated by an action signal received from any one of the other networked alarm devices 10'.

It is worth mentioning that the alarm device 10 can be automatically or manually tuned to communicate with another alarm device 10' by matching the same radio frequency. In other words, all the alarm devices 10, 10' can be set to use the same radio frequency by the manufacturer or security service company. Alternatively, the user is also able to manually tune the alarm device 10 to communicatively network with another desirable alarm device 10' or automatically tune the alarm device 10 to search another alarm device 10' that is positioned within the security distance with respect to alarm device 10.

The present invention further provides a communication process of the portable wireless alarm system which comprises at least two alarm devices 10, 10' communicatively networked with each other by means of radio frequency to contribute a security network, wherein the process comprises the steps of:

(1) Detect a motion signal within a protection area of one of the alarm devices 10, 10';

(2) Trigger the corresponding alarm device 10 to generate an alert signal and process the following step (4).

(3) Detect an informal deactivation, disconnection of power, or damage of the alarm device;

(4) Send an action signal of the radio frequency from the alarm device 10 to the other networked alarm devices 10' which are in functioning condition.

(5) Trigger each of the networked alarm devices 10' to generate an alert signal when the respective networked alarm device 10' receives the action signal within the security network.

Therefore, after setting up the portable wireless alarm system of the present invention, the alarm devices 10, 10' are ready to create the security network. When one of the alarm devices 10, 10' is triggered while detecting any motion signal, another networked alarm device 10', 10 will be automatically triggered to generate the alert signal. It is worth mentioning that the alert signals generated by the alarm devices 10 10' can be set as different kinds of signal. For example, the first alarm device 10 can be set to generate a siren signal as the alert signal while the second alarm device 10' can be set to generate a flashing light as the alert signal.

According to the preferred embodiment, the alarm device 10 can be used as an individual portable alarm device and is specifically designed for a user carrying everywhere so as to enhance the portability of the alarm device 10 with the best security. Accordingly, the portable case 11 is shaped and sized to have a compact body wherein the portable case 11 comprises a handle frame 111 for the user to carry. Due to the portability of the portable wireless alarm system, no installation is required, wherein the portable case 11 is adapted for hanging or mounting on a wall structure or even placing on a floor in an installation-free manner. In other words, the user is able to set up the portable wireless alarm system of the present invention everywhere without using any tool.

The power source 12 is embodied as a rechargeable battery 121 disposed in the portable case 11 wherein the rechargeable battery 121 of the power source 12 is electrically connected to the control processor unit 13 to supply the electricity thereto within a predetermined time period. The power source 12 further comprises an electric output 122 extended from the rechargeable battery 121 wherein the electric output 122 is adapted for electrically connecting to a power outlet so as to not only recharge the rechargeable battery 121 but also electrically connect the control processor unit 13 with the power outlet. The power outlet can be the AC current power outlet or a DC current power outlet such that when the alarm device 10 can be used indoors by hooking to the AC current power outlet or outdoors by hooking to the DC current power outlet which is extended from a battery of transportation such as aircraft, boat, or car.

Accordingly, the portable wireless alarm system is capable of standing by at least 40 hours when the rechargeable battery 121 of the power source 12 is fully charged. Therefore, the rechargeable battery 121 can function as a back up power when the portable wireless alarm system is unable to hook up to the power outlet. It is worth mentioning that the electric output 122 can be a solar battery charger adapted for converting solar energy to charge the rechargeable battery 121, especially when the portable wireless alarm system is used outdoors.

The control processor unit 13 comprises a control circuit 131 electrically connected with the RF transmitter 14 and the motion detector 15 wherein the control circuit 131 is arranged to communicate the motion detector 15 with the RF transmitter 14 in such a manner that when the motion signal is detected from the motion detector 15, the RF transmitter 14 sends a responsive action signal of the radio frequency to the alarm activator 20.

The RF transmitter 14 is a radio frequency transmitting device adapted to send and receive the radio frequency, wherein the RF transmitter 14 functions as a wireless communication link between the control processor unit 13 and the alarm activator 20. According to the present invention, a short-range radio frequency is used for communicatively networking the alarm devices 10 with each other so as to contribute the security network.

Such portable alarm device 10 is excellent to be used in all kinds of vehicle, such as private aircrafts that have to be parked at the airports, private boats that have to be parked at the harbors, container trucks and bus that have to be parked at the outdoor parking areas, and trolley trailers that have to be parked outdoor, by locating the portable alarm device 10 in the enclosure thereof. It can certainly be used in transportation cars, vans, sport utility vans, and etc. that although each of them may have a stationary alarm system installed, it can still provide additional and extended networked protection by placing a portable alarm device 10 in the passenger chamber of the vehicle.

It is apparent that although the portable alarm device 10 is convenient for carrying and using from place to place, the above mentioned security community system according to the present invention is not limited to use the portable alarm device 10 as the networked alarm device. By incorporating the RF communicating component, such as the RF transmitter 14 and the action signal generator 100, in any existing alarm systems installed in vehicles, homes, building structures, the modified alarm systems can join and networked to contribute the security network any where any time.

Therefore, the intruders can't determine which vehicles or facilities around the target vehicle or building structure are networked with its alarm device. It is impossible for the intruders to check every vehicle and facility therearound. In the matter of fact, even though the intruder deactivates, destroy or disconnect the power of the alarm device of the invaded vehicle or property to prevent its from producing alert signal, the networked alarm devices of the vehicles or building structures therearound will still be triggered to produce alert signals all around the intruder.

Moreover, the alarm device 10 is capable of linking or connecting to a designated location such as airport control center or policed apartment by sending the radio frequency signal from the RF transmitter 14. It is worth mentioning that since the portable wireless alarm system is incorporated with the radio frequency, no phone line is needed to link the alarm device 10 to the alarm activator 20 and the designated locations.

The motion detector 15 is a motion sensor adapted to detecting any motion activity within the protection area, such as a movement of a human being or opening contacts of doors and windows, wherein the motion detector 15 is a wide angle motion detector for enlarging the protection area. Accordingly, the motion detector 15 provides 110 degrees protection area that is capable of monitoring a small size of aircraft.

Each of the alarm devices 10, 10' further comprises an alert signal generator 16 electrically connected to the control processor unit 11 and arranged in such a manner that when the motion detector 15 detects the motion signal, the alert signal generator 16 is activated to generate the alert signal. Accordingly the alert signal from the alert signal generator 16 is a high power sounder having intensity approximately 110 DB.

Accordingly, the each of the alarm devices 10, 10' is capable of setting various security levels. For example:

Level 1: Personal contact. The alarm device 10 generates the alert signal and sends alert signal of the radio frequency to the user through the alarm activator 20.

Level 2: Security contact. Including the personal contact, the alarm device 10 is linked or connected to the other networked alarm devices 10' and/or at least a security office by radio frequency.

Level 3: Community contact. Including the personal contact, the alarm device 10 is linked or connected to the other networked alarm devices 10', the security office and the management office.

Level 4: Lawful enforcement. Including the community contact, the alarm device 10 is directly linked and connected to the local police department.

By setting different levels of the alarm device 10 by the user, the alarm device 10 can achieve different security degrees to protect the properties of the user. In addition, the user is able to customize the security level depending on the need of the user.

Figure 4A:
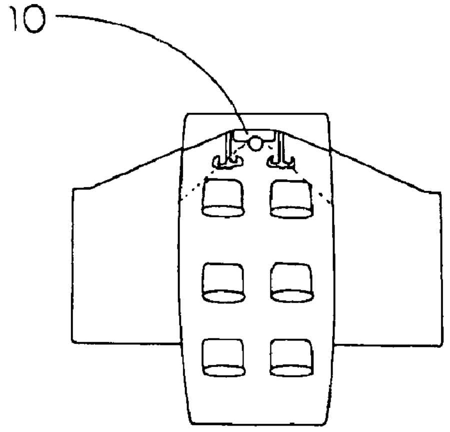
FIGS. 4A to 4E illustrate an operation of the portable wireless alarm system according to the above preferred embodiment of the present invention, illustrating one alarm device being incorporated.
Figure 4B:
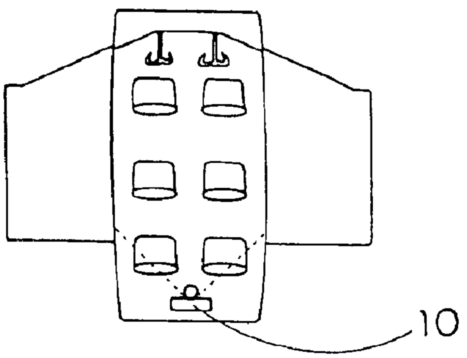

FIGS. 4A to 4E illustrate examples of using the portable wireless alarm system for the aircraft. As shown in FIG. 4A the alarm device 10 is located at a front side of the fuselage of the aircraft wherein the protection area of the alarm device 10 covers the fuselage of the aircraft in such a manner that when a motion activity occurs in the fuselage, the control processor unit 13 is activated to send the alert signal to the alarm activator 20. Likewise, the alarm device 10 is located at a rear side of the fuselage of the aircraft that the protection area 10 also covers the fuselage of the aircraft, as shown in FIG. 4B. FIGS. 4A and 4B mainly illustrate the alarm device 10 is capable of placing at different locations without installing the alarm device 10 into the fuselage of the aircraft.

Figure 4C:
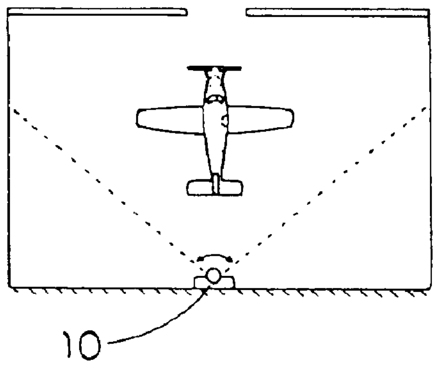
Figure 4D:
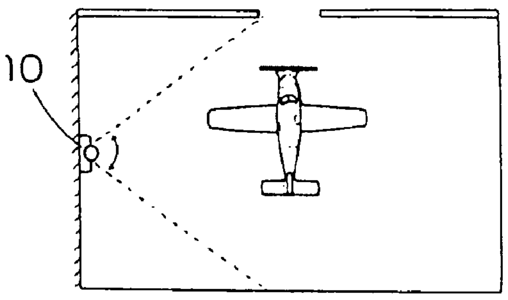

As shown in FIGS. 4C and 4D, the alarm device 10 is capable of hanging on a wall of an aircraft parking lot wherein the aircraft is parked within the protection area of the alarm device 10. FIG. 4C illustrates the alarm device 10 being set to hang on a back wall of the aircraft parking lot. FIG. 4D illustrates the alarm device 10 being set to hang on a sidewall of the aircraft parking lot. Due to the different setting locations of the alarm devices 10, the protection areas thereof will cover different portions of the aircraft.

Figure 4E:
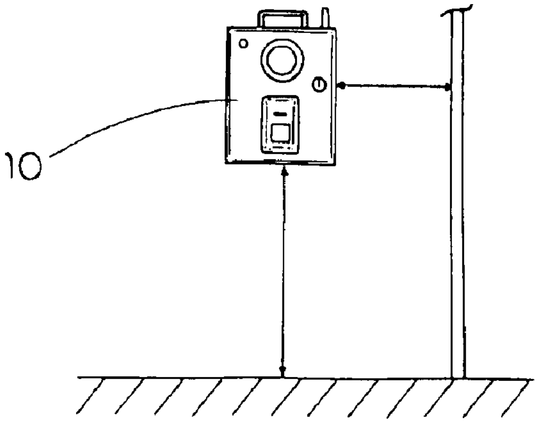

As shown in FIG. 4E, the alarm device 10 is mounted on a wall at a position closed to a door such that the alarm device 10 is capable of detecting the movement of the door, so as to detect in and out of people through the door. Preferably, the alarm device 10 is mounted on the wall at a position 8 to 10 feet above the ground and 6 to 8 feet next to the door.

The main purpose of showing the use of the alarm device is that the user is able to carry and locate the alarm device 10 at any location to be monitored. No wire or tool is needed for the installation of the alarm device 10. Therefore, the user may substantially reduce the aviation insurance premium by simply using the present invention. It is worth mentioning that, due to the portability of the present invention, the user is able to put the alarm device 10 in the vehicle as a vehicle alarm system, in the house as a residence alarm system, or even in the coin laundry.

Figure 5:
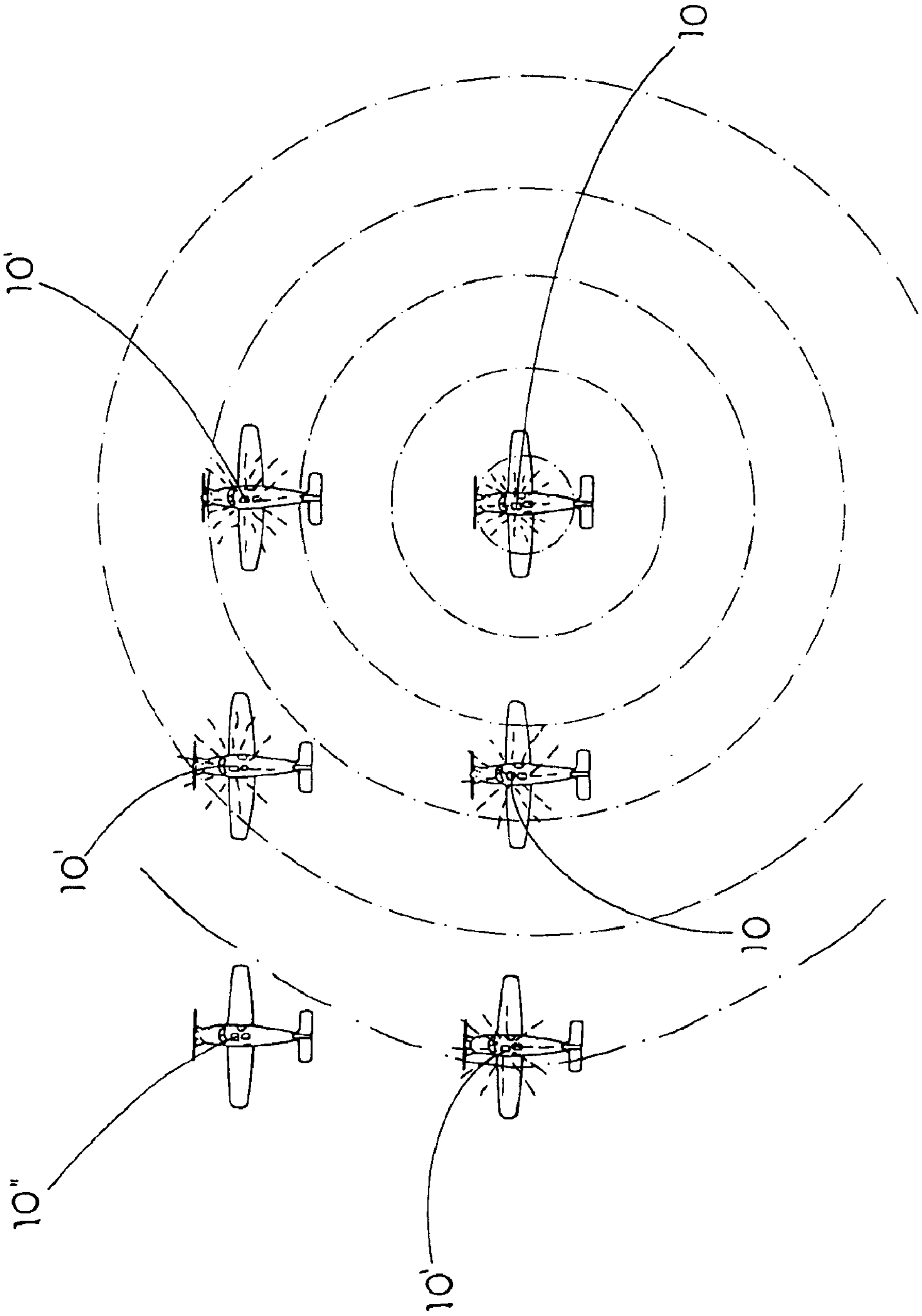
FIG. 5 illustrates an operation of the portable wireless alarm system according to the above preferred embodiment of the present invention, illustrating more than one alarm device being incorporated.

As shown in FIG. 5, a plurality of alarm devices 10, 10' is incorporated with each other as a group to enlarge the protection area for contributing a security network. The alarm devices 10, 10' are located spaced apart with each other and networked with each other by using radio frequency while the control processor units 13 of the networked alarm devices 10, 10' are set to receive the action signal of the radio frequency by the RF transmitters 14 respectively so that the alarm devices 10, 10' are capable of communicating with each other. In which, any alarm devices 10" which are not in function, i.e. standby mode, or out of the RF receiving distance are considered as non-networked alarm devices 10". Therefore, when one of the networked alarm devices 10 is triggered or informally deactivated or disconnected or damaged, the rest of the networked alarm devices 10 within the security network will be triggered as well.

The alarm device 10 further comprises a false alarm reduction system 17 which comprises a time selector 171 built-in with the control processor unit 13 for presetting a predetermined period of monitoring time and a time counter 172 electrically link to the timer selector 171 and arranged in such a manner that when the motion detector 15 detects the motion activity over the monitoring time, the control processor unit 13 is activated to send alert signal to the alarm activator 20 through the RF transmitter 14.

The false alarm reduction system 17 is mainly used to minimize the occurrence of the false alarm of the alarm device, especially when more than one alarm device 10 is incorporated. The false alarm reduction system 17 performs a particular process automatically or manually, wherein the process comprises the following steps.

(1) Activate the alert signal generator 16 to produce the alert signal for a designated period of time when one of the motion detectors 15 detects a motion activity within the respective protection area during a standby condition of the alarm device 10.

(2) Delay to activate the control processor unit 13 for a first preset time period as a single zone delaying period and a second preset time period as a cross zone delaying period which is longer than the single zone delaying period, wherein the alarm device 10 is in a verification condition during the single zone and cross delaying periods.

(3) Activate the control processor unit 13 to normally respond by activating the alert signal generator 16 to produce the alert signal when the same motion detector 15 that detected the motion activity detects another motion activity in the same protection area within the single zone delaying period during the verification condition.

(4) Activate the control processor unit 13 to normally respond by activating the alert signal generator 16 to produce the alert signal when another motion detector 15 detects another motion activity in another protection area with the cross zone delaying period during the verification condition.

(5) Reset the alarm device 10 to the original standby condition when there is no other motion activity is detected by any motion detectors 15 during the verification condition, wherein the standby alarm device 10 is ready to enter the verification condition again when there is motion activity detected by any of the motion detectors 15 again.

Therefore, if an intruder enters into the protection area and is detected by one of the motion detectors 15 of the alarm device 10, the intruder would either search around for larceny or try to escape because of the alert signal is produced. So, the same motion detector 15 or another motion detector 15 would certainly detect the intruder's activity within the single zone delaying period of the cross zone delaying period respectively and sent out a second detecting signal to the false alarm reduction system 17. When the false alarm reduction system 17 receives two or more detecting signals from the different motion detectors 15 or from the same motion detector 15 under certain circumstances, the false alarm reduction system 17 would immediately trigger the control processor unit 13 to normally respond by fully activating the alert signal generator 16 as well as the RF transmitter 14 to transmit the radio frequency to the designated location such as police station.

It is worth to mention that each user can own his or her alarm device 10 wherein when at least two users are grouped together, the alarm devices 10 are networked with each other. In other words, the networked alarm devices 10 can be controlled by different users respectively wherein the alarm activator 20 is capable of remotely controlling the respective alarm device 10. Therefore, when more users use and network the alarm devices 10 with same communicating radio frequency, the protection area will be substantially enlarged.

As shown in FIG. 3, in order to by-pass the selected alarm device 10 by the respective user, the user needs to process the following steps.

(A) Switch off the respective alarm device 10 wherein the user must locate within the protection area of the respective alarm device 10 before the motion detector 15 of the respective alarm device 10 detects the motion activity of the user.

(B) Actuate a function button of the alarm activator 20 to the respective alarm device 10.

(C) Select a by-pass function of the alarm device 10 by the respective alarm activator 20 to set the respective alarm device 10 in a by-pass condition.

(D) Switch on the alarm device 10 in the normally standby condition.

Thereafter, once the alarm device 10 is by-passed, the user is allowed to travel within the respective protection area. It is worth mentioning that the alarm activator 20 is capable of remotely controlling the respective alarm device 10 but not all the networked alarm devices 10'. Preferably, an indicator, such as a LED, built-in with the alarm device 10 is shown to indicate the alarm device 10 is in the by-pass condition.

Moreover, in order to cancel the by-pass function of the alarm device 10, the user must locate out of the protection area and switch off the alarm device 10 by the respective alarm activator 10. Then, by switching on the alarm device 10 again, the alarm device 10 returns to the original standby condition that the by-pass function of the corresponding alarm device 10 is released.

Figure 6:
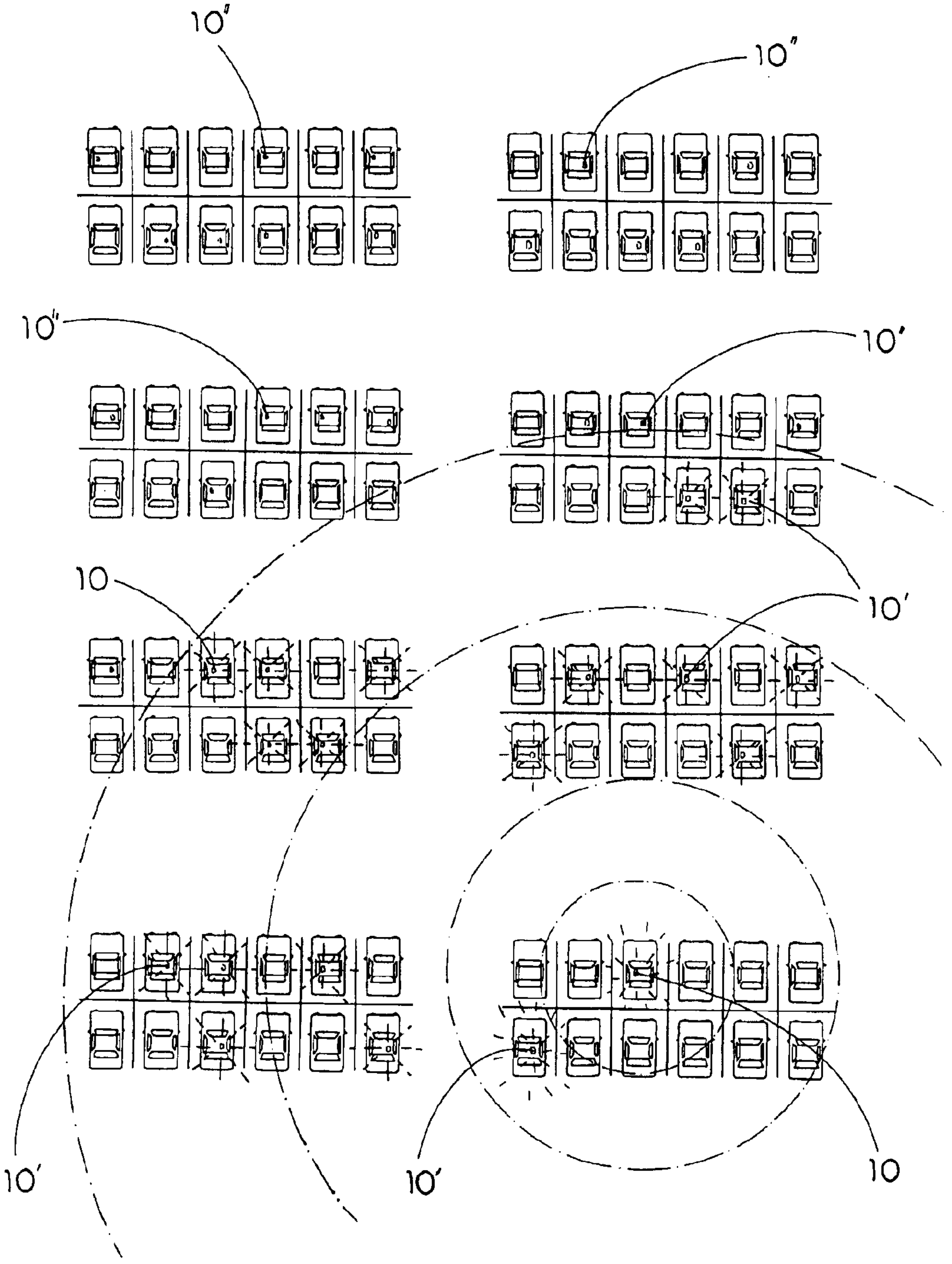
FIG. 6 illustrates an alternative operation of the portable wireless alarm system to contribute a security network according to the above preferred embodiment of the present invention.

As shown in FIG. 6, the wireless alarm system is utilized to contribute a security network. For example, if an intruder invades into a vehicle that alarm device 10 is installed or placed therein, the alarm device 10 will be triggered to perform the alert signal after detecting the intruder and generate the action signals to communicate with the other networked alarm devices 10' within the protection area, i.e. the security network. Also, if the alarm device 10 is informally deactivated, disconnected or damaged by the intruder, action signals will also be send out to communicate with the other networked alarm devices 10'. All the networked alarm devices 10' which receive the action signals are triggered by the action signals alert signal to generate the alert signals as well. In which, any alarm devices 10, 10' which are not in function, i.e standby mode, or out of the RF receiving distance are also considered as non-networked alarm devices 10, 10'.

In other words, even the alarm device 10 is destroyed by the intruder to stop the alert signal, other networked alarm devices 10' will keep generating the alert signal. In order to disarm the alert signal of the alarm device 10, the user is able to set a time interval, such as 10 minutes, in the control processor unit 13, so that after the time interval, the alarm device 10 will be automatically stop generating the alert signal. Otherwise, the user is able to use the alarm activator 20 to not only disarm the alert signal but also stop the action signal. Once the action signal is stopped, the other alarm devices 10 will also stop to generate the alert signal.

It is also able to set each of the alarm devices 10, 10' to disarm by setting a time interval in alert signal generator 16 to automatically stop generating alert signal after a predetermined period of alerting time if it is triggered by the action signal received. It is worth mentioning again that since the alarm devices 10, 10' are communicated with each other via the action signals by means of long-range radio wave, the a relatively large district of security network will be contributed so as to enlarge the coverage area of the wireless alarm system of the present invention.

In addition, each of the networked alarm devices 10' can also be selectively set to also generate action signal, when it is triggered by the action signal received from the original alarm device 10 invaded by the intruder, so that the action signal can be send to other networked alarm device 10' which are within the preset RF transmission distance therefrom but out of the preset RF transmission distance from the original alarm device 10 as to further enlarge the coverage area of the wireless alarm system of the present invention.

Alternatively, when one of the alarm devices 10 is triggered to perform the alert signal, another alarm devices 10' which is positioned at the closest location with respect to the triggered alarm device 10 will be triggered to perform the alert signal and the rest of the alarm devices 10' will be remained in a stand-by condition. Moreover, a time interval is preset for each of the alarm devices 10' such that the alert signal of each of the alarm devices 10' will be automatically cut off after the time interval.

Therefore, the wireless alarm system of the present invention is capable of setting the security layers of the coverage area to contribute the security network, i.e. the number of alarm devices 10 is evoked to perform the alert signal. For example, the user is able to set the alarm device 10 having a radial 15 meters coverage area to contribute the security network such that other alarm devices 10' within the coverage area or the closest location of the alarm device 10 within the coverage area will be triggered to generate the alert signal for a time period.

In the view of above, the present invention substantially minimizes the hassle of installing the alarm device 10, so as to enhance the portability of the alarm device 10. Besides, the user is able to self-set up the portable alarm devices and/or other stationary alarm devices to form a security network to achieve the best security for protecting the properties. Thus, the protection area is capable of substantially enlarged by simply increasing the number of alarm devices 10 which are incorporated with each other in a wireless connection manner.

What is claimed is:

1. A method of contributing a security network including two or more alarm devices to form said security network when said alarm devices come within a security distance of each other that said alarm devices are non-programmed or users of said alarm devices do not know each other, each of said alarm devices comprising a portable case receiving at least a sensor, and alert signal generator and a radio frequency (RF) transmitter which are electrically connected with a control processor, wherein the method includes the steps of:

(a) locating said alarm devices at different locations having said security distance between each other;

(b) communicatively networking said alarm devices with each other through radio frequency (RF) signals to contribute said security network such that when one of said alarm devices is located within said security distance of another said alarm device, said alarm devices detect each other to contribute said security network;

(c) setting at least one of said alarm devices in a standby condition, wherein each of said alarm devices functions as an independent alarm device to generate an alert signal from said respective alert signal generator when said respective sensor is triggered, and;

(d) activating said control processor unit of one of said alarm devices to send a RF action signal to said other alarm devices to activate said other alarm devices within said security network to generate said alert signals from said alert signal generators respectively when said one of said alarm devices is triggered.

2. The method, as recited in claim 1, wherein, in the step (c), said sensor of said alarm device set in said standby condition is monitoring a protection area, and in the step (d), said one of said alarm devices is triggered to generate said alert signal when said sensor thereof detects a motion signal within said protection area thereof .

3. The method, as recited in claim 2, wherein, in the step (d), said one of said alarm devices is also triggered to generate said action signal when said alarm device is informally deactivated.

4. The method, as recited in claim 3, wherein, in the step (d), said one of said alarm devices is also triggered to generate said action signal when said alarm device is informally disconnected from power.

5. The method, as recited in claim 4, wherein, in the step (d), said one of said alarm devices is also triggered to generate said action signal when said alarm device is damaged.

6. The method, as recited in claim 1, wherein the step (b) further comprises the step of tuning each of said alarm devices to communicate with the same radio frequency to contribute said security network.

7. The method, as recited in claim 5, wherein the step (b) further comprises the step of tuning each of said alarm devices to communicate with the same radio frequency to contribute said security network.

8. The method, as recited in claim 1, wherein the step (b) further comprises the step of automatically matching said alarm devices to communicate with a preset radio frequency.

9. The method, as recited in claim 5, wherein the step (b) comprises the step of automatically matching said alarm devices to communicate with a preset radio frequency.

10. The method, as recited in claim 1, wherein each of said alert signal generators is preset to generate said alert signal for a predetermined period of time.

11. The method, as recited in claim 5, wherein each of said alert signal generators is preset to generate said alert signal for a predetermined period of time.

12. The method, as recited in claim 5, wherein at least one of said alarm device is a portable wireless alarm device which further comprises a power source providing electrical power supply to said control processor such that said control processor, said sensor, said alert signal generator, said RF transmitter and said power source are received in said portable case.

13. The method, as recited in claim 12, wherein said power source of said portable wireless alarm device comprises a rechargeable battery disposed in said portable case wherein said rechargeable battery is electrically connected to said control processor unit to supply electricity.

14. The method, as recited in claim 13, wherein said power source of said portable wireless alarm device further comprises an electric output for electrically connecting to an external power supply so as to not only recharge said rechargeable battery but also electrically connect said control processor unit with said external power supply for electricity.

15. The method, as recited in claim 12, wherein said control processor unit of said portable wireless alarm device comprises a control circuit electrically connected with said RF transmitter and said motion detector, wherein said control circuit is arranged to communicate said motion detector with said RF transmitter in such a manner that when said motion signal is detected from said motion detector, said RF transmitter sends out said action signal correspondingly.

16. The method, as recited in claim 15, wherein said portable wireless alarm device further comprises an alarm activate which is communicating with said control processor unit of said portable wireless alarm device through radio frequency signals to remotely control an activation and deactivation of said portable wireless alarm device.

17. The method, as recited in claim 16, wherein said RF transmitter of said portable wireless alarm device is a radio frequency transmitting device adapted to send and receive said radio frequency, wherein said RF transmitter functions as a wireless communication link between said control processor unit and said alarm activator.

18. The method, as recited in claim 5, wherein the step (b) further comprises a step of communicatively networking each of said alarm devices with a designated security service provider by sending said radio frequency signals from said RF transmitter of each of said alarm devices.

19. The method, as recited in claim 17, wherein the step (b) further comprises a step of communicatively networking each of said alarm devices with a designated security service provider by sending said radio frequency signals from said RF transmitter of each of said alarm devices.

20. The method, as recited in claim 12, wherein said portable wireless alarm device further comprises a false alarm reduction system which comprises a time selector built-in with said control processor unit for presetting a predetermined period of monitoring time and a time counter electrically connected to said timer selector and arranged in such a manner that when said motion detector detects said motion activity over said monitoring time, said control processor unit is activated to send alert signal to said alarm activator through said RF transmitter.

21. The method, as recited in claim 20, wherein said false alarm reduction system performs a false alarm reduction process including the steps of:

(i) activating said alert signal generator to produce said alert signal for a designated period of time when said motion detector detects a motion activity within said respective protection area during said standby condition of said portable wireless alarm device;

(ii) delaying to activate said control processor unit for a first preset time period as a single zone delaying period and a second preset time period as a cross zone delaying period which is longer than said single zone delaying period, wherein said alarm device is in a verification condition during said single zone and cross delaying periods;

(iii) activating said control processor unit to normally respond by activating said alert signal generator to produce said alert signal when said motion detector that detected said motion activity detects another motion activity in said same protection area within said single zone delaying period during said verification condition; and (iv) resetting said alarm device to said original standby condition when there is no other motion activity is detected by said motion detectors during said verification condition, wherein said standby alarm device is ready to enter said verification condition again when there is motion activity detected by any of said motion detectors again.

22. The method, as recited in claim 21, wherein said false alarm reduction process, before the step (iv), further comprises a step of activating said control processor unit to normally respond by activating said alert signal generator to produce said alert signal when said alarm device comprises another motion detector that detects another motion activity in another protection area with said cross zone delaying period during said verification condition.

23. A communication process of two or more portable alarm devices communicatively networked with each other by means of radio frequency (RF) to contribute a security network when said alarm devices come within a security distance of each other that said alarm devices are non-programmed or users of said alarm devices do not know each other, wherein said process includes the steps of:

(a) detecting a motion signal within a protection area of one of said alarm devices;

(b) when said alarm device detects said motion signal, triggering said alarm device to generate an alert signal and process the following step (d);

(c) detecting an informal deactivation, disconnection of power, or damage of said alarm device;

(d) sending a RF action signal from said alarm device to said other alarm devices; and (e) triggering each of said alarm devices to generate said respective alert signal when said other alarm devices receive said action signal within said security network, wherein each of said portable alarm devices functions as an independent alarm device not only to generate said alert signal when said portable alarm device is triggered but also to generate said action signal to trigger other said portable alarm devices within said security network.

24. The process, as recited in claim 23, wherein said alarm devices are communicated with the same radio frequency.

25. The process, as recited in claim 23, wherein each of said alarm devices is set to generate said alert signal for a predetermined period of time.

26. The process, as recited in claim 23, wherein at least one of said alarm device is a portable wireless alarm device which further comprises a portable case to receive said control processor, said sensor which is a motion detector, said alert signal generator, and said RF transmitter, a power source providing electrical power supply to said control processor, said alert signal generator, said motion detector, and said RF transmitter.

27. The process, as recited in claim 26, wherein said power source of said portable wireless alarm device comprises a rechargeable battery disposed in said portable case wherein said rechargeable battery is electrically connected to said control processor unit to supply electricity.

28. The process, as recited in claim 27, wherein said power source of said portable wireless alarm device further comprises an electric output for electrically connecting to an external power supply so as to not only recharge said rechargeable battery but also electrically connect said control processor unit with said external power supply for electricity.

29. The process, as recited in claim 28, wherein said control processor unit of said portable wireless alarm device comprises a control circuit electrically connected with said RF transmitter and said motion detector, wherein said control circuit is arranged to communicate said motion detector with said RF transmitter in such a manner that when said motion signal is detected from said motion detector, said RF transmitter sends out said action signal correspondingly.

30. The process, as recited in claim 29, wherein said portable wireless alarm device further comprises an alarm activate which is communicating with said control processor unit of said portable wireless alarm device through radio frequency signals to remotely control an activation and deactivation of said portable wireless alarm device.

31. The process, as recited in claim 30, wherein said RF transmitter of said portable wireless alarm device is a radio frequency transmitting device adapted to send and receive said radio frequency, wherein said RF transmitter functions as a wireless communication link between said control processor unit and said alarm activator.

32. The process, as recited in claim 23, wherein the step (d) further comprises a step of sending said RF action signal from said alarm device to a designated security service provider which is communicatively networked with said alarm devices.

33. The process, as recited in claim 31, wherein the step (d) further comprises a step of sending said RF action signal from said alarm device to a designated security service provider which is communicatively networked with said alarm devices.

34. A wireless alarm system, comprising two or more alarm devices, wherein each of said alarm devices comprises a portable case receiving at least a sensor, an alert signal generator and a radio frequency (RF) transmitter which are electrically connected with a control processor, wherein said alarm devices are located at different locations having a predetermined security distance between each other, wherein said alarm devices are communicatively networked with each other through radio frequency (RF) signals to contribute a security network when one of said alarm devices is located with said security distance of another said alarm device that said alarm devices are non-programmed to communicate with each other for users of said alarm devices being not know each other, wherein at one of said alarm devices is set in a standby condition, wherein each of said alarm devices functions as an independent alarm device to generate an alert signal from said respective alert signal generator when said respective sensor is triggered, wherein when said one alarm devices alarm devices is triggered, said control processor unit of said one of said alarm devices is activated to send RF action signal to said other alarm devices to activate said other alarm devices within said security network to generate said alert signals from said alert signal generators respectively.

35. The wireless alarm system, as recited in claim 34, wherein said sensor of said alarm device which is set in said standby condition is monitoring a protection area, and said one of said alarm devices is triggered to generate said alert signal when said sensor thereof detects a motion signal within said protection area thereof.

36. The wireless alarm system, as recited in claim 35, wherein said one of said alarm devices is also triggered to generate said action signal when said alarm device is informally deactivated, informally disconnected from power supply, or damaged.

37. The wireless alarm system, as recited in claim 34, wherein said alarm devices are tuned to communicate with the same radio frequency to contribute said security network.

38. The wireless alarm system, as recited in claim 34, wherein each of said alarm devices automatically matches with each other to communicate with a preset radio frequency.

39. The wireless alarm system, as recited in claim 36, wherein said alarm devices are tuned to communicate with the same radio frequency to contribute said security network.

40. The wireless alarm system, as recited in claim 36, wherein each of said alarm devices automatically matches with each other to communicate with a preset radio frequency.

41. The wireless alarm system, as recited in claim 34, wherein each of said alert signal generators is preset to generate said alert signal for a predetermined period of time.

42. The wireless alarm system, as recited in claim 36, wherein each of said alert signal generators is preset to generate said alert signal for a predetermined period of time.

43. The wireless alarm system, as recited in claim 34, wherein at least one of said alarm device is a portable wireless alarm device which further comprises a power source providing electrical power supply to said control processor, wherein said alert signal generator, said motion detector, said RF transmitter, said sensor, said control processor, and said power source are received in said portable case.

44. The wireless alarm system, as recited in claim 36, wherein at least one of said alarm device is a portable wireless alarm device which further comprises a power source providing electrical power supply to said control processor, wherein said alert signal generator, said motion detector, said RF transmitter, said sensor, said control processor, and said power source are received in said portable case.

45. The wireless alarm system, as recited in claim 43, wherein said power source of said portable wireless alarm device comprises a rechargeable battery disposed in said portable case wherein said rechargeable battery is electrically connected to said control processor unit to supply electricity.

46. The wireless alarm system, as recited in claim 44, wherein said power source of said portable wireless alarm device comprises a rechargeable battery disposed in said portable case wherein said rechargeable battery is electrically connected to said control processor unit to supply electricity.

47. The wireless alarm system, as recited in claim 45, wherein said power source of said portable wireless alarm device further comprises an electric output for electrically connecting to an external power supply so as to not only recharge said rechargeable battery but also electrically connect said control processor unit with said external power supply for electricity.

48. The wireless alarm system, as recited in claim 46, wherein said power source of said portable wireless alarm device further comprises an electric output for electrically connecting to an external power supply so as to not only recharge said rechargeable battery but also electrically connect said control processor unit with said external power supply for electricity.

49. The wireless alarm system, as recited in claim 47, wherein said control processor unit of said portable wireless alarm device comprises a control circuit electrically connected with said RF transmitter and said motion detector, wherein said control circuit is arranged to communicate said motion detector with said RF transmitter in such a manner that when said motion signal is detected from said motion detector, said RF transmitter sends out said action signal correspondingly.

50. The wireless alarm system, as recited in claim 48, wherein said control processor unit of said portable wireless alarm device comprises a control circuit electrically connected with said RF transmitter and said motion detector, wherein said control circuit is arranged to communicate said motion detector with said RF transmitter in such a manner that when said motion signal is detected from said motion detector, said RF transmitter sends out said action signal correspondingly.

51. The wireless alarm system, as recited in claim 49, wherein said portable wireless alarm device further comprises an alarm activate which is communicating with said control processor unit of said portable wireless alarm device through radio frequency signals to remotely control an activation and deactivation of said portable wireless alarm device.

52. The wireless alarm system, as recited in claim 50, wherein said portable wireless alarm device further comprises an alarm activate which is communicating with said control processor unit of said portable wireless alarm device through radio frequency signals to remotely control an activation and deactivation of said portable wireless alarm device.

53. The wireless alarm system, as recited in claim 51, wherein said RF transmitter of said portable wireless alarm device is a radio frequency transmitting device adapted to send and receive said radio frequency, wherein said RF transmitter functions as a wireless communication link between said control processor unit and said alarm activator.

54. The wireless alarm system, as recited in claim 52, wherein said RF transmitter of said portable wireless alarm device is a radio frequency transmitting device adapted to send and receive said radio frequency, wherein said RF transmitter functions as a wireless communication link between said control processor unit and said alarm activator.

55. The wireless alarm system, as recited in claim 34, further comprises a designated security service provider, wherein said RF action signals from said RF transmitter of each of said alarm devices also sends to said designated security service provider.

56. The wireless alarm system, as recited in claim 54, further comprises a designated security service provider, wherein said RF action signals from said RF transmitter of each of said alarm devices also sends to said designated security service provider.

57. The wireless alarm system, as recited in claim 43, wherein said portable wireless alarm device further comprises a false alarm reduction system which comprises a time selector built-in with said control processor unit for presetting a predetermined period of monitoring time and a time counter electrically connected to said timer selector and arranged in such a manner that when said motion detector detects said motion activity over said monitoring time, said control processor unit is activated to send alert signal to said alarm activator through said RF transmitter.

58. The wireless alarm system, as recited in claim 54, wherein said portable wireless alarm device further comprises a false alarm reduction system which comprises a time selector built-in with said control processor unit for presetting a predetermined period of monitoring time and a time counter electrically connected to said timer selector and arranged in such a manner that when said motion detector detects said motion activity over said monitoring time, said control processor unit is activated to send alert signal to said alarm activator through said RF transmitter.

59. The wireless alarm system, as recited in claim 57, wherein said false alarm reduction system performs a false alarm reduction process including the steps of:

(i) activating said alert signal generator to produce said alert signal for a designated period of time when said motion detector detects a motion activity within said respective protection area during said standby condition of said portable wireless alarm device;

(ii) delaying to activate said control processor unit for a first preset time period as a single zone delaying period and a second preset time period as a cross zone delaying period which is longer than said single zone delaying period, wherein said alarm device is in a verification condition during said single zone and cross delaying periods;

(iii) activating said control processor unit to normally respond by activating said alert signal generator to produce said alert signal when said motion detector that detected said motion activity detects another motion activity in said same protection area within said single zone delaying period during said verification condition; and (iv) resetting said alarm device to said original standby condition when there is no other motion activity is detected by said motion detectors during said verification condition, wherein said standby alarm device is ready to enter said verification condition again when there is motion activity detected by any of said motion detectors again.

60. The wireless alarm system, as recited in claim 58, wherein said false alarm reduction system performs a false alarm reduction process including the steps of:

(i) activating said alert signal generator to produce said alert signal for a designated period of time when said motion detector detects a motion activity within said respective protection area during said standby condition of said portable wireless alarm device;

(ii) delaying to activate said control processor unit for a first preset time period as a single zone delaying period and a second preset time period as a cross zone delaying period which is longer than said single zone delaying period, wherein said alarm device is in a verification condition during said single zone and cross delaying periods;

(iii) activating said control processor unit to normally respond by activating said alert signal generator to produce said alert signal when said motion detector that detected said motion activity detects another motion activity in said same protection area within said single zone delaying period during said verification condition; and (iv) resetting said alarm device to said original standby condition when there is no other motion activity is detected by said motion detectors during said verification condition, wherein said standby alarm device is ready to enter said verification condition again when there is motion activity detected by any of said motion detectors again.

61. The wireless alarm system, as recited in claim 59, wherein said false alarm reduction process, before the step (iv), further comprises a step of activating said control processor unit to normally respond by activating said alert signal generator to produce said alert signal when said alarm device comprises another motion detector that detects another motion activity in another protection area with said cross zone delaying period during said verification condition.

62. The wireless alarm system, as recited in claim 60, wherein said false alarm reduction process, before the step (iv), further comprises a step of activating said control processor unit to normally respond by activating said alert signal generator to produce said alert signal when said alarm device comprises another motion detector that detects another motion activity in another protection area with said cross zone delaying period during said verification condition.

* * * * *